March 6, 1962    B. J. WARMAN    3,024,428
MAGNETO-STRICTIVE DELAY LINES
Filed Nov. 12, 1957

BLOOMFIELD JAMES
WARMAN
Inventor

Attorneys

United States Patent Office 3,024,428
Patented Mar. 6, 1962

3,024,428
MAGNETO-STRICTIVE DELAY LINES
Bloomfield James Warman, Charlton, London, England, assignor to Siemens Edison Swan Limited, London, England, a British company
Filed Nov. 12, 1957, Ser. No. 695,819
Claims priority, application Great Britain Nov. 14, 1956
6 Claims. (Cl. 333—17)

This invention relates to so-called magnetostrictive or acoustic delay lines, which consist basically of an elongate magnetostrictive element of ferro-magnetic material coupled electromagnetically with input and output coils spaced apart along the length of said element, the output coil being associated with a small permanent magnet which is positioned so as to set up a steady magnetic field through the coil. A varying current in the input coil causes changes in the magnetisation of the magnetostrictive element which as is well-known produce changes in the dimensions of the element due to the magnetostrictive effect. This produces a stress wave which results in longitudinal disturbances being propagated along the element from the input coil, with a velocity V which is approximately equal to the speed of sound through the material and is given by the formula $$V = \sqrt{\frac{E}{d}}$$

where E is Young's modulus of elasticity and $d$ is the density of the material of the magnetostrictive element. The longitudinal stress waves travelling along the element produce dimensional changes therein during their progress. In the portion of the magnetostrictive element passing through the output coil these dimensional changes vary the reluctance of the magnetic circuit provided by the permanent magnet and the resulting change of the flux causes small voltages to be induced into the windings of the output coil. The delay introduced by the delay line depends on the distance between the input and output coils and the speed of sound in the magnetostrictive material used. There is no need for the acoustic path as constituted by the elongate magnetostrictive element to be straight and the element may be coiled up so as to occupy only a small space.

It is necessary to terminate the magnetostrictive element at each end with some form of damping medium in order to prevent reflection of the longitudinal waves from the ends, some of the most suitable materials for this purpose being thick grease, rubber of P.V.C.

Such a delay line finds application in the electronic art, in computers, in automatic telephone exchanges and so on, and may be of considerable length to give delays of the order of one to five milliseconds. The delay line may be used as a temporary information store, in which event its storage time is that of its delay, or as a circulating store in which signals from the output coil of the line are continuously fed back to the input coil for re-storage, so that the overall storage time for a given item of information may be any desired period.

Since the delay time of a magnetostrictive delay line is a function of the elastic constants and effective length of the magnetostrictive element, it is therefore temperature dependent. Consequently in using such lines for signal storage they cannot readily be synchronised with other timed cycles since variation of temperature can cause such large changes of delay time that it is difficult to identify the stored signals on a time basis.

This drawback can be overcome either by placing the magnetostrictive element of the delay line in a temperature controlled oven—which is not usually practicable unless the oven can be shared by a large number of delay lines, even at the inconvenience of having the delay lines at some distance from their associated apparatus—or by using for the magnetostrictive element some ferro-magnetic material, such as certain nickel-iron alloys, having a negligible temperature coefficient.

According to the present invention however, difficulty due to temperature variation of the magnetostrictive element of a magnetostrictive delay line is avoided or reduced by providing means for passing an electric heating current through the element and means responsive to variation in resistance or other temperature-dependent characteristic of the material of said element for controlling the magnitude of said current to maintain the temperature of the delay line substantially constant. In this way the magnetostrictive element of the delay line serves as its own temperature controlling and heating element, the effect being enhanced if the delay line is lagged.

In order that the invention may be more fully understood reference will now be made to the accompanying drawings in which.

Figures 1, 2, 3:
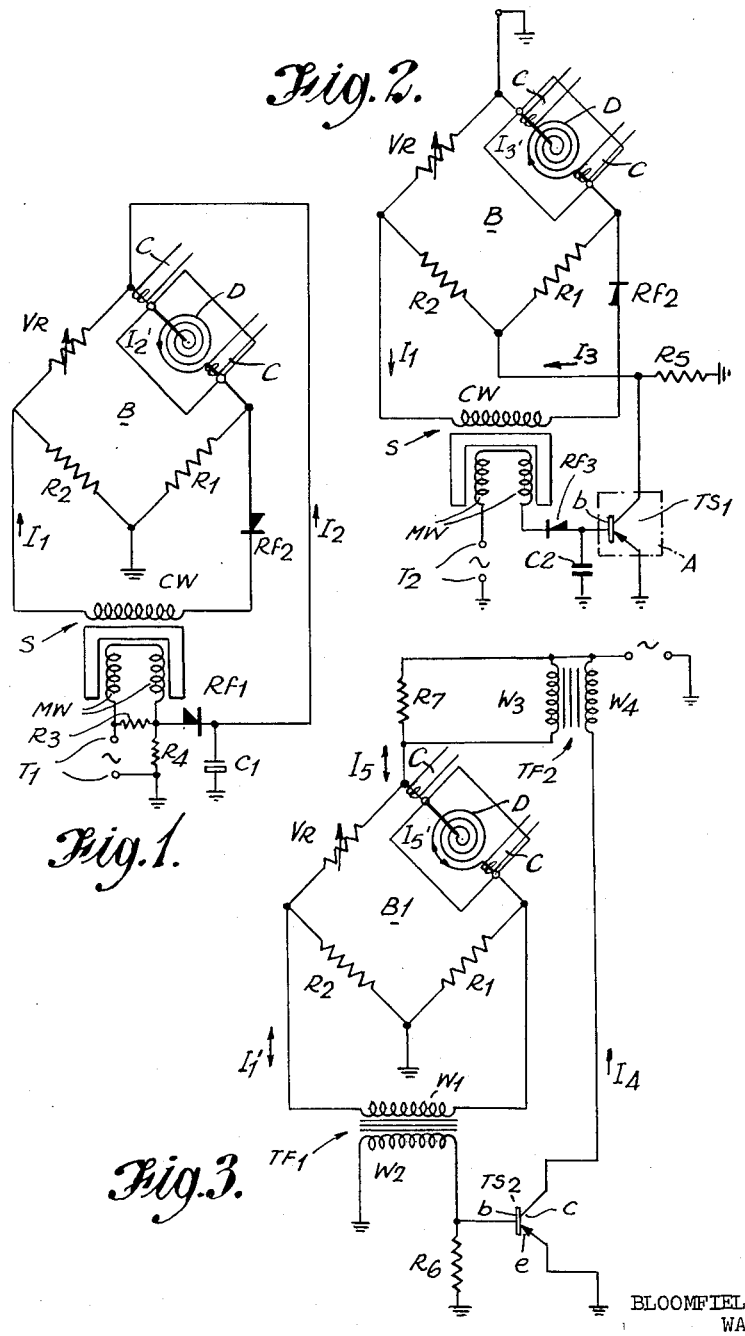
FIG. 1 illustrates an embodiment in which the magnetostrictive element of the delay line is fed with D.C. heating current from a saturable reactor controlled according to the resistance of the element.
FIGS. 2 and 3 are other embodiments in which a similarly controlled saturable reactor controls the heating current by way of a transistor amplifier, the heating current being D. C. for FIG. 2 and A.C. for FIG. 3.

All three figures are purely diagrammatic and in each the delay line is represented by a spiral D representing its magnetostrictive element and by coils representing its input and output coils. The permanent magnet normally associated with the delay line has not been represented.

In carrying out the invention it is contemplated to electrically connect the magnetostrictive element of the delay line in one arm of a balanceable bridge circuit fed by a heating current which is controlled according to the state of balance (i.e. balanced or unbalanced) of the bridge and is arranged to be reduced to a minimum when the bridge is substantially balanced. This will take place at a predeterminable temperature at which the temperature dependent resistance of the magnetostrictive element has a value appropriate to balancing the bridge. In practice the bridge would be set to balance at a temperature in excess of the maximum ambient (room) temperature to which the delay line may be subject, so that in this way the possibility of the bridge being taken beyond balance by rise in the ambient temperature would be avoided.

In the particular embodiment illustrated in FIG. 1, the magnetostrictive element D of the delay line is connected as one arm of a Wheatstone bridge B which is adjusted by a variable resistance VR in another arm to give balance at a delay line temperature above the maximum expected ambient temperature. The other two arms of the bridge B are constituted by respective impedances shown as resistances R1 and R2.

Unbalance of the bridge B is detected by a control winding CW of a saturable reactor S having its main winding MW connected across one of two impedances (shown as resistances R3, R4) which constitute respective parts of an impedance voltage divider connected across terminals T1 to which an A.C. supply is connected. The bridge B is fed through a rectifier R/1 from across the other (R4) of these two impedances, and a capacitor C1 is shunted across the bridge to eliminate from its feed A.C. ripple such as might induce sharply rising edges into the delay line output coil if permitted to flow through the magnetostrictive element D. Initially the bridge B will be unbalanced since the resistance of the magnetostrictive element, assumed to increase with temperature, is below the value to give balance. The control winding CW of the saturable reactor S will therefore carry unbalance current (I1) to cause the reactor S to saturate. The main winding MW of the reactor consequently provides a maximum shunting effect (minimum impedance) across the impedance R3, resulting in the rectified current (I2) fed to the bridge B over rectifier Rf1 being a maximum. In the bridge, the part I2' of this current which flows through the magnetostrictive element D of the delay line heats up the element so that its temperature and resistance will rise towards the value at which the bridge is set to balance, reducing as they do so the current I1 which is causing saturation of the reactor S. When this latter current I1 reaches a sufficiently low value, the reactor S will become unsaturated and its main winding MW will accordingly provide an increased impedance shunting the impedance R3. Consequently the current I2 fed to the bridge B, and thus the heating current I2' will be reduced and the temperature of the delay line D will tend to drop. Stability will be obtained just short of bridge balance at a point where the unbalance is just insufficient to cause saturation of the reactor S and produce further temperature rise in the delay line. Variations in ambient temperature, which will affect the delay line only as regards the rate of dissipation of its controlling heat, will be compensated for by variation of the reactor saturating current, and thus of the heating current, as the temperature of the delay line varies to destroy the bridge balance. This compensation is effective only so long as the resistance of the magnetostrictive element is below the value for balance, so that the heating of the delay line resulting from saturation of the reactor by the unbalance current tends to drive the bridge into balance. Should the resistance of the magnetostrictive element rise above the value giving balance, the reactor S will again be saturated, in reverse, and further heating of the delay line D would take place tending to drive the bridge further out of balance. Although this latter condition would be abnormal, since heating of the delay line D is effectively stopped when the reactor becomes unsaturated as the bridge approaches balance and since the ambient temperature cannot take the delay line beyond that for balance, nevertheless there is the possibility that the condition might arise while adjusting the setting of the bridge. It is therefore desirable to insert a rectifier Rf2 in circuit with the reactor control winding CW in order to prevent reverse saturation of the reactor S.

In the embodiment of the invention illustrated in FIG. 2, in which the magnetostrictive element D of delay line is again included as one arm of a Wheatstone bridge B and unbalance of the bridge is detected by a control winding CW of a saturable reactor S, the bridge current (I3), part of which I3' also is the heating current for the delay line D, is fed to the bridge B through an amplifier A controlled from the main winding MW of the saturable reactor S in accordance with the magnitude of the current passed by the latter winding from an A.C. source connected at terminals T2: to this end the reactor main winding MW is shown connected across the terminals T2 in series with a rectifier Rf3 and capacitor C2, the amplifier A being controlled by the voltage appearing across the capacitor C2. The amplifier A may comprise, as shown, a transistor TS1 controlled on its base electrode b: alternatively the amplifier A could comprise a further saturable reactor (not shown) controlled on its control winding and feeding D.C. power to the bridge circuit, which saturable reactor, being able to give a greater amplification effect in response to bridge unbalance, could therefore evidently control the delay line temperature with greater accuracy. Assuming that the amplifier A is controlled to pass negligible current when the detecting reactor S is unsaturated, it would be arranged, as by shunting the amplifier A by a relatively high resistance R5, that the bridge B would initially be fed with a small current in order to initiate control by the reactor S. The reactor control winding CW detecting bridge unbalance would again have a rectifier Rf2 connected in circuit therewith for the purpose already indicated.

In the two embodiments so far described with reference to FIGS. 1 and 2 the bridge B has been fed with direct current I2 or I3, this having an advantage over feeding with A.C. in that possible loss of control due to the bridge being driven or adjusted through and beyond balance can be avoided in a simple manner by the inclusion of a rectifier Rf2 in circuit with the control winding CW of the unbalance detecting reactor S as previously indicated. It is, however, possible to feed the bridge with A.C. and to provide against such loss of control by detecting and utilising change of phase of the unbalance output from the bridge. The embodiment of FIG. 3 works on this principle.

In FIG. 3 the magnetostrictive element D of the delay line is connected as one arm of a balanceable A.C. bridge B1 and bridge unbalance (current I1') is detected by the primary winding W1 of a transformer TF1 across whose secondary winding W2 is connected a resistor R6. The bridge B1 is fed with A.C. in series with one winding W3 of another transformer TF2, this winding W3 being shunted by a relatively high resistance R7 to provide a starting current through the bridge B1. The other winding, W4, of the transformer TF2 is connected across the A.C. source in series with the collector-emitter path c—e of a transistor TS2 between the base b and emitter e of which is applied the voltage appearing across the secondary winding W2 of the detecting transformer TF1. The windings W1 and W2 of this latter transformer are so related that when the delay line is heating up towards the temperature for balance of the bridge B1, the voltage appearing on its secondary winding W2 causes the transistor TS2 to conduct and to draw current I4 through the winding W4 of transformer TF2. This current I4, which increases the heating current, I5', of the delay line by producing an increase in the current I5 which is fed to the bridge by way of the other winding W3 of transformer TF2, can be regarded either as being transformed into this winding W3 to augment that already there or as being a load on this transformer causing increased (primary) current in the winding W3. Once the delay line D has heated up to balance the bridge B1, the detecting transformer TF1 provides no output voltage, the transistor TS2 stops conducting, and balance is maintained. If for any reason, such as adjustment of the setting of the bridge B1, the magnetostrictive element D of the delay line assumes a resistance higher than that for balance, the phase orientation of the resultant unbalance current I1' will be reversed and the transistor TS2 will draw current which opposes, through the feed transformer TF2, the current I5 producing heating of the delay line; thus loss of control is prevented. As in the embodiment of FIG. 2 the transistor TR2 in FIG. 3 could be replaced by an appropriately connected saturable reactor.

Whereas three embodiments of the invention have been particularly described above, it is to be understood that many other embodiments are possible in which the magnetostrictive element of the delay line is used in accordance with the invention as a combined heating and regulating element. Moreover instead of using the resistance characteristic of the magnetostrictive element for controlling the heating current passed through it, it is contemplated that the heating current may be controlled for instance by reference to the delay time of the line. Thus by way of example it would be possible to circulate special synchronising pulses in the delay line and to control, in accordance with the time relationship which they bear to fixed clock pulses, the amount of heating current passed through the line.

What I claim is:

1. In combination: a magnetostrictive delay line comprising an elongate magnetostrictive element having a temperature-dependent electrical impedance and input and output coils spaced along it; a source of electrical energy providing heating current for said element, means electrically connecting said element to said source whereby the heating current flows through said element; and means sensitive to variation of the electrical impedance of said element consequent upon temperature change thereof for controlling the magnitude of the heating current, said current tending to maintain the magnetostrictive element at a constant temperature.

2. In combination: a magnetostrictive delay line comprising an elongate magnetostrictive element having a temperature-dependent electrical impedance and input and output coils spaced along it; a balanceable bridge circuit having said magnetostrictive element electrically connected in one arm thereof; a source of electric energy; means electrically connecting the bridge circuit to said source whereby said bridge circuit is fed with electric current, a portion of said current flowing through the magnetostrictive element as heating current therefor; and means for controlling the magnitude of the current fed to the bridge circuit in accordance with the state of balance of the bridge circuit as determined by the temperature-dependent impedance of said element, said current being reduced to a minimum value when the bridge circuit is substantially balanced.

3. A combination as claimed in claim 2 wherein said means for controlling the magnitude of the bridge circuit current comprises a saturable reactor having a control winding connected for energisation in accordance with unbalance of the bridge as determined by the impedance of said element, and a main winding connected to determine the magnitude of said current in accordance with the extent of energisation of the control winding.

4. A combination as claimed in claim 3 including a voltage divider having a part across which said main winding of the saturable reactor is connected and a part from across which the bridge circuit is fed with current in accordance with a divided voltage determined by the extent of energisation of said control winding of the saturable reactor.

5. A combination as claimed in claim 4 including a rectifier through which the bridge circuit is fed from said voltage divider and a smoothing capacitance effectively shunting the bridge circuit in respect of A.C. ripple in said current fed to it.

6. A combination as claimed in claim 3 including an amplifier connected to determine the magnitude of the said current and to be controlled from said main winding of the saturable reactor in accordance with the magnitude of the current passed by the latter under control of the control winding.

References Cited in the file of this patent

UNITED STATES PATENTS

| | | |
|---|---|---|
| 2,676,305 | Fondiller | Apr. 20, 1954 |
| 2,723,372 | Eagan et al. | Nov. 8, 1955 |
| 2,730,670 | Borg | Jan. 10, 1956 |
| 2,760,165 | Sullivan | Aug. 21, 1956 |
| 2,786,968 | Kabak | Mar. 26, 1957 |
| 2,825,866 | Morse | Mar. 4, 1958 |

FOREIGN PATENTS

| | | |
|---|---|---|
| 163,776 | Australia | June 30, 1955 |